United States Patent [19]
Chow et al.

[11] Patent Number: 6,131,187
[45] Date of Patent: Oct. 10, 2000

[54] METHOD AND SYSTEM FOR TRANSLATING EXCEPTION HANDLING SEMANTICS OF A BYTECODE CLASS FILE

[75] Inventors: Chung Hen Chow; Yu Chung Liao, both of Austin, Tex.

[73] Assignee: International Business Machines Corporation, Armonk, N.Y.

[21] Appl. No.: 09/134,826

[22] Filed: Aug. 17, 1998

[51] Int. Cl.[7] ................................................. G06F 9/45
[52] U.S. Cl. ........................... 717/5; 717/4; 717/2; 717/9
[58] Field of Search ................................. 395/705, 704, 395/709, 702; 707/206, 205; 711/202, 6; 712/244, 245, 233, 220; 714/57, 48

[56] References Cited

U.S. PATENT DOCUMENTS

| | | | |
|---|---|---|---|
| 5,303,369 | 4/1994 | Borcherding et al. | 709/104 |
| 5,628,016 | 5/1997 | Kukol | 395/704 |
| 5,748,964 | 5/1998 | Gosling | 395/705 |
| 5,761,513 | 6/1998 | Yellin et al. | 395/705 |
| 5,812,759 | 9/1998 | Brooks | 714/57 |
| 5,974,524 | 10/1999 | Cheong et al. | 712/23 |
| 6,009,517 | 12/1999 | Bak et al. | 712/245 |

OTHER PUBLICATIONS

Wong et al., "Exception Handling In C++ Without Language Extension," Proceedings of 1993 IEEE Region 10 Conference on Computer, Communication, Control and Power Engineerng TENCON '93, Oct. 19–21, 1993, 411–414 vol. 1.

Hsieh et al., "Java Bytecode to Native Code Translation: The Caffine Prototype and Preliminary results," Proceedings., 29th Annual IEEE/ACM Int'l. Symposium on Microarchitecture, MICRO–29, Dec. 2–4, 1996, pp. 90–97.

*Primary Examiner*—Tariq R. Hafiz
*Assistant Examiner*—Tuan Q. Dam
*Attorney, Agent, or Firm*—Casimer K. Salys; Felsman, Bradley, Vaden, Gunter & Dillon, LLP

[57] ABSTRACT

A method for translating exception handling semantics of a bytecode class file within a computer system is disclosed. An empty bytecode information array is first established. Pertinent information is then obtained by examining bytecodes within a bytecode stream, and such information are inserted into the bytecode information array. An exception framelist, which includes an exception handling routine, is subsequently obtained from a class file for the bytecode stream. The entries within the bytecode information array corresponding to a starting location and an ending location of the exception framelist are marked. Finally, a high-level code sequence is generated utilizing the bytecode information array.

12 Claims, 2 Drawing Sheets

METHOD AND SYSTEM FOR TRANSLATING EXCEPTION HANDLING SEMANTICS OF A BYTECODE CLASS FILE

BACKGROUND OF THE INVENTION

1. Technical Field

The present invention relates to a method and system for data processing in general, and in particular to a method and system for processing bytecodes within a computer system. Still more particularly, the present invention relates to a method and system for translating exception handling semantics of a bytecode class file within a computer system.

2. Description of the Prior Art

With the advent of wide-area networks such as the Internet, a new class of high-level programming languages has been developed in order to support the diverse hardware and software platforms within these wide-area networks. Programs written in this new class of high-level programming languages are generally compiled into bytecodes that can be interpreted in a user's computer system by a bytecode interpreter, typically in the form of software, during runtime. Java™ is an example of a high-level programming language that can be compiled into bytecodes, and Java™ has been gaining popularity within the industry in recent years.

There are several characteristics that are unique to Java™ bytecodes. First, Java™ bytecodes are data type specific and utilize separate opcodes to specify the same basic operation for different primitive data types. Accordingly, a group of bytecodes are included within the Java™ instruction set to perform each basic function (for example, to add two numbers), with each bytecode being utilized to process only data of a particular data type. In addition, the Java™ bytecode instruction set is notable for not including certain instructions that are commonly found in other high-level programming languages. For example, the Java™ instruction set does not include a "goto" instruction or an instruction for modifying objects references or creating new object references (other than copying an existing object reference). These kinds of restrictions in the Java™ bytecode instruction set help to ensure that all Java™ bytecode programs will utilize data in a manner that is consistent with the data type specific instructions in the Java™ bytecode instruction set.

As mentioned above, bytecodes are typically interpreted in a user's computer system by a software bytecode interpreter during runtime. In order to improve performance, a bytecode program can also be compiled by an appropriate compiler into native executable modules after the bytecodes have been translated into instructions of a compilable high-level software language. Be that as it may, sometimes the speed improvement may not be as significant as desired because some of the bytecodes, such as the exception handling semantics, are not easily optimized by the compiler. The exception handling semantics, embedded within an exception handling structure (or exception framelist) of a bytecode class file, are designed to allow the bytecode interpreter to handle exceptions that occur during an enclosed try statement. However, the exception handling structure prevents the translated high-level code from being optimized by the compiler because the artificial exception ranges kept in the exception table of a method preclude the final natively compiled instructions from being rescheduled for optimal performance. The present disclosure provides an improved method for translating exception handling semantics within a bytecode class file.

SUMMARY OF THE INVENTION

In accordance with the method and system of the present invention, an empty bytecode information array is first established. Pertinent information is then obtained by examining bytecodes within a bytecode stream, and such information are inserted into the bytecode information array. An exception framelist, which includes an exception handling routine, is subsequently obtained from a class file for the bytecode stream. The entries within the bytecode information array corresponding to a starting location and an ending location of the exception framelist are marked. Finally, a high-level code sequence is generated utilizing the bytecode information array.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be executed in a variety of computers under a number of different operating systems. The computer may be, for example, a personal computer, a midrange computer or a mainframe computer. In addition, the computer may be a stand-alone system or part of a network such as a local-area network (LAN) or a wide-area network (WAN). For the purpose of illustration, a preferred embodiment of the present invention, as described below, is implemented on a personal computer, such as the Aptiva™ series manufactured by International Business Machines Corporation of Armonk, N.Y.

Figure 1:
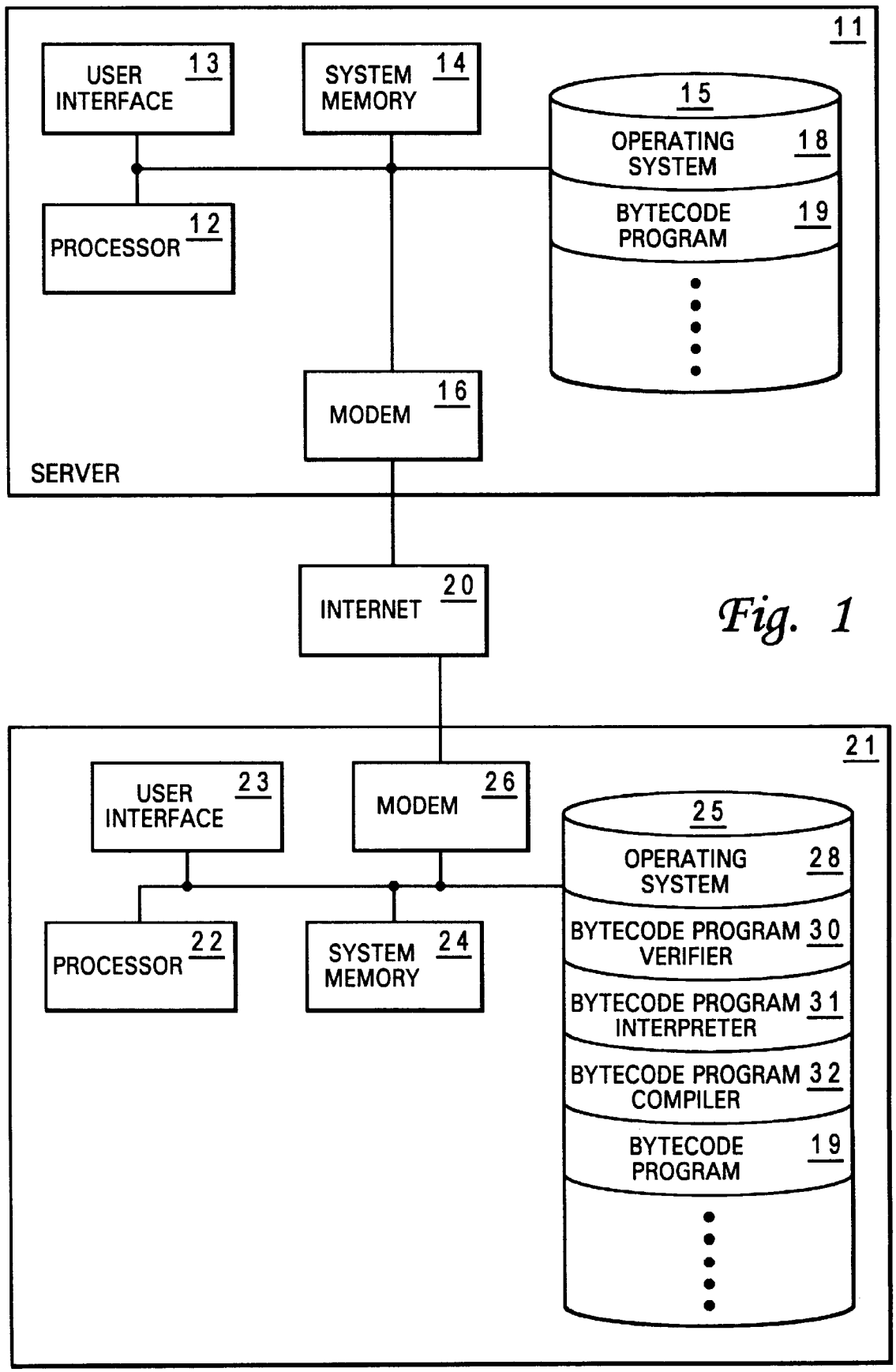
FIG. 1 is a block diagram of a computing environment in which a preferred embodiment of the present invention is applicable.

Referring now to the drawings and in particular to FIG. 1, there is illustrated a block diagram of a computing environment to which a preferred embodiment of the present invention is applicable. As shown, computer server 11 is a file server, which typically includes a processor 12, a user interface 13, a system memory 14, a direct access storage device (DASD) 15, and a communication interface, such as a modem 16, for connecting computer server 11 to a computer communication network such as an internet 20. DASD 15 stores various programs that can be executed by processor 12 and/or distributed to other computer nodes, such as a computer system 21, via internet 20.

Computer system 21 is coupled to computer server 11 via internet 20. Computer system 21 includes a processor 22, a user interface 23, a system memory 24, a DASD 25, and a communication interface, such as a modem 26, for connecting computer system 21 to internet 20. DASD 25 stores various programs, of which at least one is a bytecode program 19 that can be executed by processor 22. Typically, bytecode program 19 is downloaded from computer server 11 via internet 20 using a file transfer protocol that is well-known to those skilled in the art. For the purpose of this description, bytecode program 19 is preferably formed from Java™ bytecodes, which can be interpreted by a bytecode interpreter during runtime.

Computer server 11 and computer system 12 may utilize different hardware platforms and operating systems, e.g., computer server 11 may be an RS/600™ Workstation using an AIX operating system while computer system 12 may be an IBM compatible personal computer using a Pentium™ processor and a Microsoft™ Windows operating system, such that object code programs cannot be executed interchangably between computer server 11 and computer system 12. Furthermore, other computer systems coupled to computer server 11 may utilize a variety of different hardware platforms and a variety of operating systems.

Even though there are many types of computers connected to internet 20, instead of distributing different platform versions of the same computer program for each of the distinct computer platforms (e.g., AIX, Unix, Windows, DOS, etc.), bytecode programs enable a single version of the computer program to be distributed. All that is required is for each computer within the network to have a bytecode program verifier and a bytecode interpreter. For example, computer system 21 stores in its DASD 25 a bytecode program verifier 30 for verifying the id of a specified bytecode program, and a bytecode program interpreter 31 for executing the specified bytecode program.

Bytecode program verifier 30 is an executable program that verifies operand data type compatibility and stack manipulations properness in a specified bytecode program prior to the execution of the bytecode program by processor 22 under bytecode program interpreter 31. Each bytecode program has an associated verification status value that is initially set when the bytecode program is being downloaded from another location, such as a file server. The verification status value for the bytecode program will be set to a logical true by bytecode program verifier 30 only after the bytecode program has been verified for passing all the data types and stack usage tests performed by bytecode program verifier 30.

During normal execution of the bytecode program by bytecode program interpreter 31, bytecode program interpreter 31 must continually monitor the operand stack for overflows (i.e., attempting to add more data to the stack than the stack can store) and underflows (i.e., attempting to pop data off the stack when the stack is empty). Such stack monitoring must normally be performed for all bytecodes that change the status of the stack.

Although bytecodes are typically interpreted in a user's computer system with bytecode program interpreter 31 during execution, in order to improve speed performance, bytecodes can also be compiled into native executable modules after the bytecodes have been translated into a set of compilable high-level software instruction, such as C. Hence, alternately, or in addition, computer system 21 may include a bytecode program compiler 32 for converting a translated bytecode program into an object code program. The object code program should be able to be executed more efficiently than the "original" bytecode program via bytecode program interpreter 31.

In general, an exception handling structure is typically embedded within a bytecode class file in order to allow bytecode program interpreter 31 to handle any exceptions that may occur during runtime. An exception is a software error condition that interrupts the flow of a bytecode program. Within a Java™ virtual machine, an exception always occurs when the bytecode program executes a throw instruction. The throw instruction passes control to an associated catch block. A catch block is a section of code designed to process the thrown exception. A catch block must immediately follow a try block or another catch block. The try block encloses a sequence of statements from which a throw can originate. If there is no catch block in the current function, control exits immediately to the calling method without returning a value. Then, a catch block is searched within that method. If a catch block cannot be found, the control is passed to another method that called the above-mentioned method. Control continues to pass up through the call stack until a catch block capable of handling the error is found.

The exception handling structure within a bytecode program, however, prevents the translated high-level object code to be optimized by bytecode program compiler 32. This is because the artificial exception ranges kept within an exception table of a method normally prevent the final natively compiled instructions to be rescheduled for optimal performance.

Figure 2:
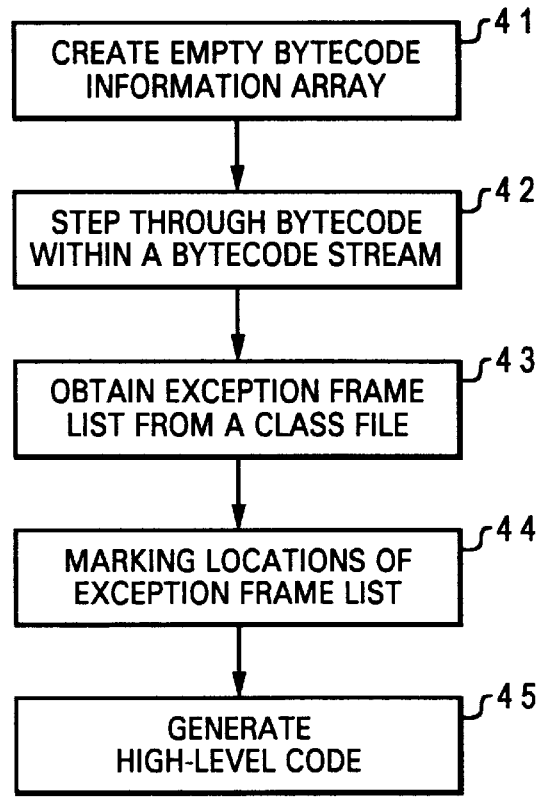
FIG. 2 is a high-level logic flow diagram of a method for translating exception handling semantics of a bytecode class file, in accordance with a preferred embodiment of the present invention.

With reference now to FIG. 2, there is illustrated a high-level logic flow diagram of a method for translating exception handling semantics within a bytecode class file, in accordance with a preferred embodiment of the present invention. An empty bytecode information array is first established, as shown in block 41.

Figure 3:
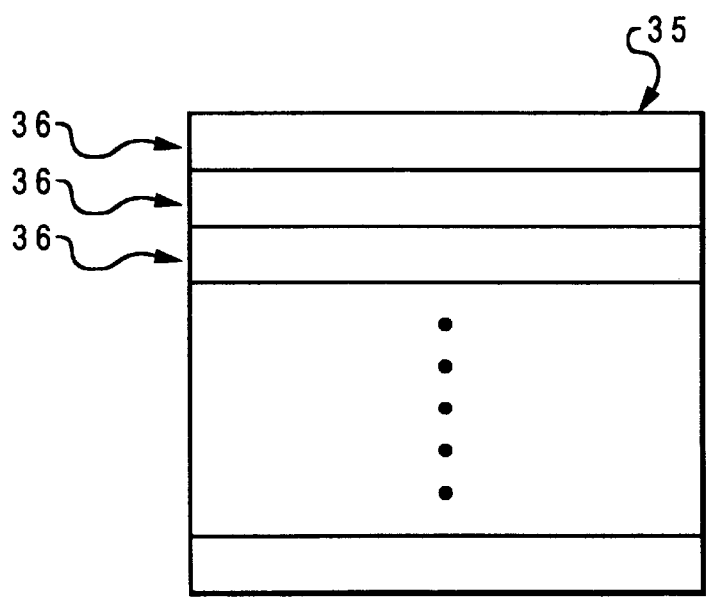
FIG. 3 is a diagram of a bytecode information array in accordance with a preferred embodiment of the present invention.

Referring now to FIG. 3, there is illustrated a diagram of a bytecode information array in accordance with a preferred embodiment of the present invention. As shown, bytecode information array 35 includes multiple entries 36. Each entry 36 is intended to be filled with certain pertinent information for each bytecode. After being filled with pertinent information, bytecode information array 35 can be utilized for the translation of bytecode into a compilable high-level code such as C. An example of the pertinent information required for each entry 36 within bytecode information array 35 is summarized in the first column of Table I.

TABLE I

| | |
|---|---|
| pc | program counter |
| sp | stack pointer |
| eh | exception handler program counter |
| CatchType | the catch type for an exception handler |
| info | branch address, type or argument size for different opcode |
| flags | markers for INSTRUCTION, SUBROUTINE EX_HANDLER, TRY_START, TRY_END |

As shown, the pertinent information preferably includes a program counter, a stack pointer, an exception handler program counter (if present), the catch type for the exception handler (in necessary), other information such as branch address, and various flags. All pertinent information in each entry 36 of bytecode information array 35 is obtained by stepping through each bytecode within a given bytecode stream, as depicted in block 42. The following pseudocode provides an example of the stepping-through process:

Procedure StepThruCode:
  Loop:
    read a bytecode from bytecode stream;
    if the bytecode is marked INSTRUCTION, then
      <stop>;
    if the bytecode is a branch instruction, recursively call
      <procedure StepThruCode>;
    if the bytecode is a return instruction, then <stop>;
    calculate and update the pc and sp of the current code
      data;

calculate the next bytecode position and back to Loop.

The exception framelist is then obtained from a class file, as illustrated in block 43. The exception framelist, typically sorted in a nested manner, contains information for each catch frame, which includes the start program counter and the end program counter, the catch type, and the exception handler program counter. Subsequently, the entries in bytecode information array 35 that correspond to a starting location and an ending location of the exception framelist are marked. The following pseudocode provides an example of the marking process:

Procedure MarkExceptionHandler:
    get an exception CatchFrame;
    mark EX_HANDLER flag on the code of the handler_pc;
    update CatchType of the bytecode information array of the handler_pc;
    update eh of all the code data within the starts_pc and end_pc of the CatchFrame to be handler_pc.

Finally, the compilable high-level code is generated based on the established bytecode information array, as shown in block 45. The following pseudocode provides an example of the code generation process:

For each bytecode:
    generate a label from its pc;
    generate a high-level code to carry out the semantics of the current bytecode;
    if the semantics is able to generate an exception, check if the exception occurs; if so, generate the high-level code to go to the label of the current eh;
    if the bytecode is marked EX_HANDLER,
        check if the CatchType is correct;
        if the CatchType is not correct, go to the eh of the current code;
        if no current eh pc, then generate return code.

As has been described, the present invention provides an improved method for translating exception handling semantics of a bytecode class file within a computer system. Instead of following the exception handling mechanism of a Java™ class file, the present invention analyzes the exception handling frames defined in the class file. Based on the information, when each bytecode is translated into a set of compilable high-level code, such as C statements, the location of the exception handler can be ascertained. Accordingly, goto statements may be inserted as inline statements within the generated code, and condition check statements can be generated wherever exceptions may occur. Because the entry of an exception handler is explicitly indicated in the generated code, the generated code can be safely compiled and optimized without breaking the semantics of the exception handling routine.

There are several advantages associated with the present invention. First, there is no artificial basic blocks required for the exception handling frame and thus the compiler is able to optimize and rearrange the bytecode sequence completely while still maintaining the original program semantics as well as the exception handling semantics. Second, the Java™ virtual machine exception handling semantics can be completely captured. Third, there is no need to utilize the exception mechanism of a processor, and thus the runtime support is much simpler. Forth, the exception handling overhead can be reduced dramatically, depending on the code structure, by analyzing the basic blocks of the bytecode stream. If no exception occurred for an instruction working on the same operand(s), then the generation of exception handling code, such as Null PointerException and ArrayOutOfBoundException, for all the subsequent instructions of the same opcode and operands is not required.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for translating exception handling semantics within a bytecode class file from a bytecode stream in a computer system, said method comprising the steps of:

establishing a bytecode information array;

examining each bytecode within said bytecode stream to insert pertinent information into said bytecode information array;

obtaining an exception framelist from said bytecode class file, wherein said exception framelist includes an exception handling routine;

marking said insert pertinent information in said bytecode information array that correspond to a starting location and an ending location of said exception framelist; and generating a high-level code sequence utilizing said bytecode information array of said marking step.

2. The method according to claim 1, wherein said pertinent information includes program counters, stack pointers, and exception handler program counter.

3. The method according to claim 1, wherein said obtaining step further includes a step of obtaining said exception framelist from a class file within said bytecode stream.

4. The method according to claim 1, wherein said generating step further includes a step of generating a high-level code sequence via a compiler.

5. A computer system capable of translating exception handling semantics within a bytecode class file from a bytecode stream, comprising:

a bytecode information array;

means for examining each bytecode within said bytecode stream to insert pertinent information into said bytecode information array;

means for obtaining an exception framelist from said bytecode class file, wherein said exception framelist includes an exception handling routine;

means for marking said insert pertinent information in said bytecode information array that correspond to a starting location and an ending location of said exception framelist; and means for generating a high-level code sequence utilizing said bytecode information array of said marking means.

6. The computer system according to claim 5, wherein said pertinent information includes program counters, stack pointers, and exception handler program counter.

7. The computer system according to claim 5, wherein said obtaining means further includes a means for obtaining said exception framelist from a class file within said bytecode stream.

8. The computer system according to claim 5, wherein said generating means is a compiler.

9. A computer program product residing on a computer usable medium for translating exception handling semantics within a bytecode class file from a bytecode stream within a computer system, said computer program product comprising:

program code means for establishing a bytecode information array;

program code means for examining each bytecode within said bytecode stream to insert pertinent information into said bytecode information array;

program code means for obtaining an exception framelist from said bytecode class file, wherein said exception framelist includes an exception handling routine;

program code means for marking said insert pertinent information in said bytecode information array that correspond to a starting location and an ending location of said exception framelist; and program code means for generating a high-level code sequence utilizing said bytecode information array of said marking program code means.

10. The computer program product according to claim 9, wherein said pertinent information includes program counters, stack pointers, and exception handler program counter.

11. The computer program product according to claim 9, wherein said program code means for obtaining further includes a program code means for obtaining said exception framelist from a class file within said bytecode stream.

12. The computer program product according to claim 9, wherein said program code means for generating is a compiler.

* * * * *